United States Patent [11] 3,615,168

| [72] | Inventor | Friedel H. P. Wehmeier<br>Murray Hill, N.J. |
|---|---|---|
| [21] | Appl. No. | 849,351 |
| [22] | Filed | Aug. 12, 1969 |
| [45] | Patented | Oct. 26, 1971 |
| [73] | Assignee | Bell Telephone Laboratories, Incorporated<br>Murray Hill, N.J. |

[54] GROWTH OF CRYSTALLINE RARE EARTH IRON GARNETS AND ORTHOFERRITES BY VAPOR TRANSPORT
7 Claims, 2 Drawing Figs.

[52] U.S. Cl. .................................................. 23/21,
23/51, 117/106, 117/235
[51] Int. Cl. .................................................. C22b 59/00
[50] Field of Search .......................................... 23/21, 51;
117/106, 169, 235

[56] References Cited
UNITED STATES PATENTS
| 3,131,082 | 4/1964 | Gambino .................... | 23/51 X |
| 3,178,313 | 4/1965 | Moest ........................ | 117/106 X |
| 3,421,933 | 1/1969 | Pulliam ...................... | 117/106 X |
| 3,429,740 | 2/1969 | Mee ............................ | 117/106 |

OTHER REFERENCES
Mee et al., " Applied Physics Letters," Vol. 10, May, 1967, pp. 289–291.

*Primary Examiner*—Herbert T. Carter
*Attorneys*—R. J. Guenther and Edwin B. Cave

ABSTRACT: A process for the production of crystals of the yttrium and rare earth iron garnets and orthoferrites by vapor transport using HCl or $Cl_2$ has been developed. It has been found that the addition of s sufficient amount of $FeCl_3$ to the reactants suppresses the decomposition of the deposited material and allows the production of crystals of excellent quality. The process is adaptable to sealed capsule or open tube operation.

PATENTED OCT 26 1971　　　　　　　　　　　　　　　　　3,615,168

INVENTOR
F. H. P. WEHMEIER
BY
*George S. Grudy*
ATTORNEY

GROWTH OF CRYSTALLINE RARE EARTH IRON GARNETS AND ORTHOFERRITES BY VAPOR TRANSPORT

BACKGROUND OF THE INVENTION

1. Field of the Invention

Yttrium and rare earth iron garnets and orthoferrites can be deposited by vapor transport for possible application in microwave and memory devices. These materials can be deposited as bulk crystals or as epitaxial layers on suitable substrates.

2. Description of the Prior Art

The yttrium and rare earth iron garnets and orthoferrites being magnetic insulators have found application in a large variety of high-frequency devices such as microwave nonreciprocal devices, acoustical devices (which may make use of their magnetostrictive properties), magneto-optic devices, and as storage elements in magnetic memories. The production of crystalline bodies of these materials has been accomplished in a number of ways including the growth from a flux and the sintering of powders. A technique which has recently seen active development is the production of these crystalline materials by vapor transport.

Vapor transport using only an inert gas carrier is impractical because these materials are unstable at the temperatures which would be required for this process. A more promising process is vapor transport using a chemical reacting gas. In this process, the carrier gas reacts with the starting materials forming volatile species which are subsequently deposited in a region of the system which is maintained at a lower temperature. In various procedures, the starting materials can be chemically identical to the required product or they can be constituent materials which are deposited as the final product. Chemical reaction of the reactants can take place in a sealed system in which the constituents are usually supplied in approximately stoichiometric quantities or in an open system in which there is a gas flow maintained from the region of the starting materials to the region in which deposition takes place. In this latter case the vapor flows may be regulated to maintain the proper partial pressures in the region of deposition.

Even though these processes using chemically reacting gases take place at temperatures lower than would be necessary for inert gas vapor transport, they are still subject to chemical instabilities and it has been difficult to realize satisfactory crystal growth. For example, when attempting to grow yttrium iron garnet using HCl as a chemically reacting transport gas and using yttrium iron garnet as a starting material, it is found that only $Fe_2O_3$ is transported and $Y_2O_3$ is left behind. The most successful attempts appearing in the literature to date (Mee et al. Appl Phys Lett, Vol 10 (1967) 289) involve the use of $YCl_3$ and $FeCl_2$ as the source materials and a combination of He, HCl, $H_2O$ and $O_2$ as the carrier gases.

SUMMARY OF THE INVENTION

It has been found that inclusion of a suitable quantity of $FeCl_3$ in addition to the otherwise accepted source reactants stabilizes the transport reaction and the product crystalline material. This allows the deposition of crystalline bodies without the presence of spurious reaction products. The overpressure of $FeCl_3$ allows a simple one-carrier gas system in which either HCl or $Cl_2$ alone can produce successful crystal deposition. This invention is applicable over a wide range of conditions. The source reactants can be composed of simply the product material and a carrier gas or they can be a combination of a carrier gas with the yttrium or rare earth chloride, $FeCl_3$ and $O_2$ or $H_2O$ or the carrier gas with the yttrium or rare earth oxide, $FeCl_3$ and $O_2$ or $H_2O$. If the carrier gas is $Cl_2$ then the additional gas will be $O_2$. If carrier gas is HCl then $H_2O$ will be needed. While not necessary, various gases which do not take part in the chemical reactance can be included in order to suitably adjust the gaseous partial pressures.

The invention is adaptable to sealed systems or open ended systems and the crystalline material can be deposited as a bulk crystal or as epitaxial layers on substrates present in the region of deposition. The utility of this system is limited at the upper end of the pressure scale by the need to maintain the partial pressure of the rare earth chloride less than its partial pressure over its own liquid and at the lower end by the need to maintain practical rates of material transport. Such transport becomes impractically slow if the partial pressure of the carrier gas is less than $10^{14}$ atmosphere.

When working with a sealed system it is convenient to load the system with carrier gas at 1 atmosphere. Thus, at usual temperatures of operation, the internal partial pressure of the carrier gas is of the order of 4 atmospheres. In an open system, it is convenient to operate at a total pressure of 1 atmosphere in which case inert gases might be used to adjust the various partial pressures to the appropriate values. The sealed capsule operations take place with the source materials typically, between 1,000° C. and 1,600° C. and a temperature difference between the source end and the deposition end of the system greater than 10° C. Temperature differences of 100° C. have been used. These still yield conveniently controllable deposition and do not represent an upper limit. Temperature differences less than 5° C. result in impractically slow deposition rates. In open tube operation, where the carrier gas is caused to flow from the source end of the vessel to the deposition region, temperature differences as described above may not be required. In some situations, the temperature at the source end of the vessel may be lower than the temperature in the deposition region.

DETAILED DESCRIPTION OF THE INVENTION

Chemistry of the Systems Under Consideration

Figure 1:
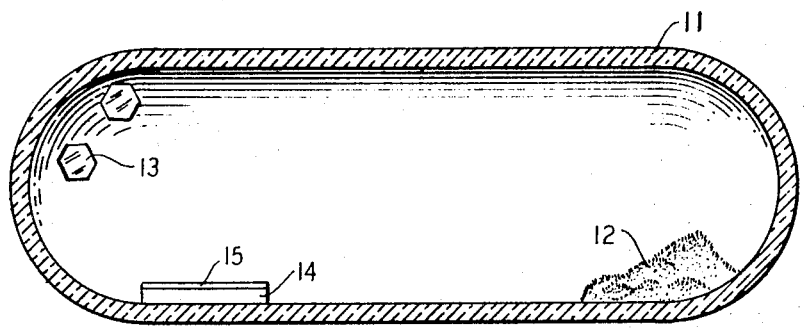
FIG. 1 is a plane view in section of a sealed vapor transport capsule showing bulk crystal growth and epitaxial growth on a substrate.

The yttrium and rare earth iron garnets and orthoferrites are ternary compounds composed of rare earth elements, iron and oxygen. The garnets have the general formula $R_3Fe_5O_{12}$. The orthoferrites have the general formula $R\,Fe\,O_3$, where R is yttrium or a rare earth element selected from the list Ce, Pr, Nd, Pm, Sm, Eu, Gd, Tb, Dy, Ho, Er Tm, Yb and Lu. According to the invention disclosed here, crystalline bodies of these materials are produced by vapor transport using either HCl or $Cl_2$ as the chemically reacting carrier gas and including in the deposition chamber an overpressure of $FeCl_3$.

In the *garnet* system, the reactants are transported according to the following chemical equation which will be hereinafter referred to as the *transport reaction*;

$$R_3Fe_5O_{12} + 24HCl = 3RCl_3 + 5FeCl_3 + 12H_2O, \quad (1)$$

if HCl is used as the carrier-gas. If $Cl_2$ is used as the carrier-gas then $O_2$ appears in the right-hand side of the transport reaction equation in place of $H_2O$ with appropriate balancing. All of the products on the right-hand side are gases at the temperature of transport.

In order to accomplish successful transport another reaction must also be considered. This will be referred to as the *decomposition reaction*. This reaction follows the chemical equation;

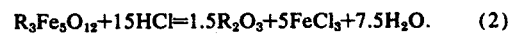

$$R_3Fe_5O_{12} + 15HCl = 1.5R_2O_3 + 5FeCl_3 + 7.5H_2O. \quad (2)$$

Here, at the transport-temperature $R_2O_3$ is a solid and in many cases will be deposited in the region of the source. The transported vapors, then, lose their stoichiometry and unwanted compounds are deposited at the deposition end producing imperfect crystals. If successful transport is to be accomplished, conditions must be maintained so that the free energy of this reaction is positive. If this condition is met, the decomposition reaction will proceed towards the left making the ternary phase stable both in the source region and in the deposition region.

In the *orthoferrite* system, the *transport reaction* is;

$$RFeO_3 + HCl = RCl_3 bzFeCl_3 + 3H_2O. \quad (3)$$

The corresponding *decomposition reaction* is;

$$RFeO_3 + HCl = 0.5\ R_2O_3 + FeCl_3 + 1.5H_2O. \quad (4)$$

(If $Cl_2$ is used as a carrier gas, $O_2$ will be produced in place of $H_2O$ as above.)

Thermodynamics of the Systems Under Consideration

The free energy ($\Delta G$) of any of the above reactions can be calculated in terms of tabulated data and the partial pressures of the gaseous reactants according to the formula;

$$\Delta G = \Delta G^\circ + RT \ln K \quad (5)$$

In equation (5) $\Delta G^\circ$ is the free energy of the reaction at standard conditions (gaseous constituents at 1 atmosphere pressure) and can be calculated at any temperature from tabulated data (O. Kubachewski and E. Ll. Evans, "Metallurgical Thermochemistry" 4th Ed., Pergamon Press) and ordinary thermodynamic relations. R is the universal gas constant, T is the absolute temperature and K is the constant appearing in the law of mass action. For instance, for the decomposition reaction in the *garnet* system $$K = \frac{p^5(FeCl_3) \times p^{7.5}(H_2O)}{p^{15}(HCl)}, \quad (6)$$

(6) where $p^5(FeCl_3)$, for instance, is the 5th power of the partial pressure of $FeCl_3$. Noting that the exponents appearing on the right of equation (6) correspond to the stoichiometric coefficients of the species in equation (2), a corresponding relation for any of the chemical reactions contemplated can be written. It has been found that for the systems under consideration $\Delta G$ can be made positive by including, in addition to the source reactants an amount of $FeCl_3$ in order to produce an overpressure of $FeCl_3$ in the vessel.

The following is a suggested procedure for the determination of this additional amount of $FeCl_3$. Assuming a particular HCl partial pressure, the partial pressure of $FeCl_3$ which represents the equilibrium condition for the decomposition reaction (equation (2) ) must be found. This is found by setting $\Delta G$ in equation (5) equal to zero and noting that at equilibrium the partial pressure of $H_2O$ equals 1.5 times the partial pressure of $FeCl_3$. This relation in addition to tabulated data and the assumed pressure of HCl permits the calculation of the equilibrium partial pressure of $FeCl_3$. In order to make $\Delta G$ positive, an additional amount of $FeCl_3$ must be incorporated in the system so as to increase the partial pressure of $FeCl_3$ at least of the order of 1 percent above equilibrium value. Depending upon the accuracy of the tabulated data used in this calculation and the temperature gradient in the vessel, an additional margin may be desired. Margins as great as 100 percent have been used, but they do not represent an upper limit of utility. If the temperatures difference between the source region and the deposition region of the apparatus is large, the calculation should be done at both temperatures in order to make sure $\Delta G$ is still positive and the deposited material is stable.

Given a set of conditions appropriate to one pressure level, the reaction conditions appropriate to any other pressure level can be derived directly from the consideration of equation (6). Assuming, for instance, that it is desired to work at one-tenth of the original HCl pressure one need only adjust the partial pressure of $FeCl_3$ and $H_2O$ so as to keep $\Delta G$ of the reaction of equation (2), positive.

This procedure would be useful if, for instance, it is desired to take the results of a sealed capsule experiment and apply them to an open tube apparatus.

The knowledgeable practitioner can directly extend this procedure to the orthoferrite system and to the use of $Cl_2$ as a carrier gas by suitably treating the partial pressures of the various species in the corresponding balanced decomposition equation.

Starting Materials

Figure 2:
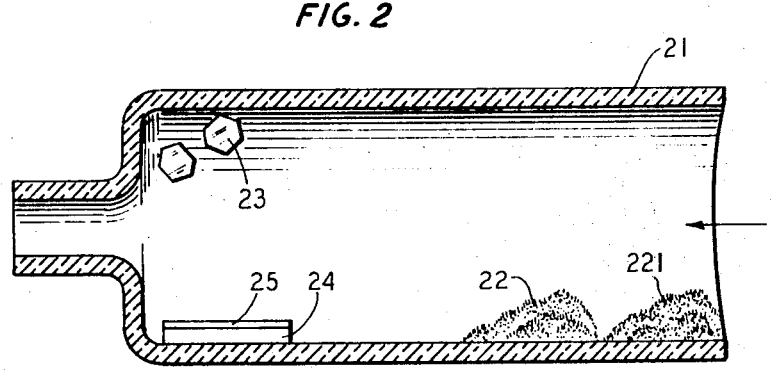
FIG. 2 is a plane view in section of an open tube vapor transport vessel showing bulk crystal growth and epitaxial growth on a substrate.

The various possible sets of source reactants can be obtained from consideration of the transport and the decomposition reactions. In addition to the carrier gas and the additional amount of $FeCl_3$ calculated as above, the starting materials can be (1) chemically identical to the desired product material or its binary constituent oxides in the form of crystal pieces, polycrystalline bodies or sintered materials (perhaps in crushed or powder form in order to increase the surface area for chemical reaction), (2) the reactants on the right side of the *transport* reaction; (3) the reactants on the right side of the *decomposition* reaction; or (4) the reactants on the right side of a reaction similar to the decomposition reaction but including $Fe_2O_3$ and $RCl_3$. If source materials (2), (3) or (4) are used, it is usually desirable to maintain the required partial pressures of the gaseous species by including appropriate amounts of the source materials 12 in a sealed system 11 (see FIG. 1) or by regulating the flow of the various materials 22, 221 in an open system 21 (see FIG. 2). This flow can be regulated by such means as variation of orifice size or selective heating of the various constituents. In many applications, it is desirable to alter such properties of the pure ternary material (the garnet or the orthoferrite) as the saturation magnetization. This can be done by the partial substitution of a nonmagnetic species for a portion of one of the magnetic species or by the partial substitution of a species with a different magnetic moment. Such species as Al and Ga have been used for this purpose. In such a case the corresponding free energies must be considered and it may prove necessary to include an overpressure of the corresponding chloride (e.g. $AlCl_3$ or $GaCl_3$) in order to stabilize the reaction.

Example

As a practical example of the application of this invention, the vapor transport of yttrium iron garnet (YIG) has been performed. This material is particularly important in high frequency electromagnetic technology today. The decomposition was performed in a sealed capsule using HCl as a carrier gas and polycrystalline YIG as a source material. As a matter of convenience the capsule was filled with HCl at atmospheric pressure and sealed. This produced a pressure of approximately 4 atmospheres at the reaction temperature. Using 4 atmospheres as a starting partial pressure of HCl, the equilibrium of $FeCl_3$ was calculated as discussed in the procedure above as approximately 2.5 atmospheres. The capsule was charged with 1 atmosphere of HCl, polycrystalline $Y_3Fe_5O_{12}$, and 8 milligrams of $FeCl_3$ per cubic centimeter of capsule volume. The source end of the capsule was maintained at 1,140° C. and the deposition need of the capsule was maintained 100° C. lower. These conditions produced a total partial pressure of $FeCl_3$ approximately equal to 5 atmospheres. At the end of one week 1,200 milligrams of bulk single crystals 13 of $Y_3Fe_5O_{12}$ were produced at random nucleation sites in the deposition region. If a suitable substrate 14 had been supplied, the 1,200 milligrams of material would have produced epitaxial film 15 of 10 micron thicknesses over a 200 square centimeter area.

What is claimed is:

1. A process for the growth of a crystalline body of a material containing at least, one compound selected from the group of ternary compounds consisting of the yttrium and rare earth iron orthoferrites and the yttrium and rare earth iron garnets in a reacting vessel, maintained between 900° C. and 1,600°

C., by vapor transport from a source region, containing stoichiometric amounts of (1) $RCl_3$, $FeCl_3$ and $H_2O$ or $O_2$, or (2) $R_2O_3$, $FeCl_3$ and $H_2O$ or $O_2$, or (3) $Fe_2O_3$, $RCl_3$ and $H_2O$ or $O_2$, or (4) $R_3Fe_5O_{12}$ or $RFeO_3$, or (5) $R_2O_3$ and $Fe_2O_3$ as source reactants containing HCl when $H_2O$ is a source reactant, $Cl_2$ when $O_2$ is a source reactant or HCl or $Cl_2$ when neither $H_2O$ or $O_2$ is a source reactant.

2. A process of claim 1 in which the partial pressure of the carrier gas is greater than $10^{14}$ atmospheres.

3. A process of claim 2 in which the said reacting vessel is sealed.

4. A process of claim 3 in which the temperature of the said deposition region is lower than the temperature of the said source region by at least 5° C.

5. A process of claim 4 in which the said yttrium rare earth iron garnet is yttrium iron garnet.

6. A process of claim 2 in which the said reacting vessel is open and in which the carrier gas is caused to flow therethrough in a direction from the said source region to the said deposition region.

7. A process of claim 6 in which the said yttrium and rare earth iron garnet is yttrium iron garnet.

* * * * *

UNITED STATES PATENT OFFICE
CERTIFICATE OF CORRECTION

Patent No. 3,615,168    Dated October 26, 1971

Inventor(s) Friedel H. P. Wehmeier

It is certified that error appears in the above-identified patent and that said Letters Patent are hereby corrected as shown below:

Column 2, line 10, that portion reading "$10^{14}$" should read --$10^{-4}$--. Column 3, line 9, equation (3) should be changed to read  --$RFeO_3 + 6HCl = RCl_3 + FeCl_3 + 3H_2O$--.
Column 3, line 12, equation (4) should be changed to read as follows:  --$RFeO_3 + 3HCl = 0.5 R_2O_3 + FeCl_3 + 1.5 H_2O$--.
Column 4, lines 48 and 49, the word "decomposition" should be --deposition--.

Column 5, line 5, in claim 1, after "reactants" insert --where R is one element selected from the group consisting of Y, Ce, Pr, Nd, Pm, Sm, Eu, Gd, Tb, Dy, Ho, Er, Tm, Yb and Lu, to a deposition region using at least one carrier gas--;

Line 7, same column, after "is a source reactant" insert --characterized in that the said reacting vessel also contains $FeCl_3$ as an initial ingredient in such quantity as to produce a positive value of the free energy, $\Delta G$, of the decomposition reaction embodied in the chemical equation containing the said compound and the said carrier gas on the left side and the oxide of the said rare earth, ferric chloride and the gas needed for balance on the right side where $\Delta G = \Delta G° + RT \ln K$, $\Delta G°$ is the free energy at standard conditions, R is the Universal Gas Constant, T is the absolute temperature and K constant appearing in the Law of Mass Action--.

Column 5, line 9, that portion "$10^{14}$" should read --$10^{-4}$--;
Column 5, line 9, after "atmospheres" insert --in the reacting vessel--.

Signed and sealed this 16th day of May 1972.

(SEAL)
Attest:

EDWARD M. FLETCHER, JR.
Attesting Officer

ROBERT GOTTSCHALK
Commissioner of Patents